(12) United States Patent
Droux et al.

(10) Patent No.: US 7,669,303 B2
(45) Date of Patent: Mar. 2, 2010

(54) COMPLEX COMPRISING A DRYLAID VEIL OF GLASS FIBRES, AND A NONWOVEN FABRIC OF ORGANIC FIBRES

(75) Inventors: Michel Droux, La Ravoire (FR); Marc Berkhoff, Ede (NL); Leonardus Lucas, Duiven (NL); Eric Daniel, Chambery (FR)

(73) Assignee: Saint-Gobain Technical Fabrics Europe, Chambery (FR)

( * ) Notice: Subject to any disclaimer, the term of this patent is extended or adjusted under 35 U.S.C. 154(b) by 17 days.

(21) Appl. No.: 12/168,169

(22) Filed: Jul. 7, 2008

(65) Prior Publication Data

US 2008/0274659 A1 Nov. 6, 2008

Related U.S. Application Data

(62) Division of application No. 10/544,710, filed as application No. PCT/EP2004/001109 on Feb. 6, 2004, now Pat. No. 7,412,756.

(30) Foreign Application Priority Data

Feb. 11, 2003 (EP) .................................. 03290332

(51) Int. Cl.
*D06B 5/08* (2006.01)
(52) U.S. Cl. .............................. 28/104; 28/103; 28/105
(58) Field of Classification Search .................. 28/104, 28/105, 103
See application file for complete search history.

(56) References Cited

U.S. PATENT DOCUMENTS

| | | | |
|---|---|---|---|
| 3,664,909 A | 5/1972 | Ackley | |
| 3,975,565 A | 8/1976 | Kendall | |
| 4,237,180 A | 12/1980 | Jaskowski | |
| 4,277,531 A | 7/1981 | Picone | |
| 4,522,876 A | 6/1985 | Hiers | |
| 4,726,987 A | 2/1988 | Trask et al. | |
| 4,755,423 A | 7/1988 | Greiser et al. | |
| 4,847,140 A | 7/1989 | Jaskowski | |
| 4,948,649 A | 8/1990 | Hiers et al. | |
| 5,017,426 A | 5/1991 | Wolfgang et al. | |
| 5,018,255 A | 5/1991 | Bolliand | |
| 5,047,276 A | 9/1991 | Chomarat et al. | |
| 5,171,629 A | 12/1992 | Heidel et al. | |
| 5,175,042 A | 12/1992 | Chomarat | |
| 5,616,395 A | 4/1997 | Baravian et al. | |
| 5,761,778 A | 6/1998 | Fleissner | |
| RE36,756 E | 6/2000 | Wahl et al. | |
| 6,114,262 A | 9/2000 | Groh et al. | |
| 6,123,172 A | 9/2000 | Byrd et al. | |
| 6,235,657 B1 | 5/2001 | Schops et al. | |
| 6,412,154 B1 | 7/2002 | Ploetz | |
| 2005/0170731 A1 | 8/2005 | Droux et al. | |

FOREIGN PATENT DOCUMENTS

| | | |
|---|---|---|
| GB | 2 123 452 | 2/1984 |
| WO | WO 01/09420 | 2/2001 |
| WO | WO 01/09421 | 2/2001 |

*Primary Examiner*—Andrew T Piziali
(74) *Attorney, Agent, or Firm*—Oblon, Spivak, McClelland, Maier & Neustadt, L.L.P.

(57) ABSTRACT

The invention concerns a process for preparing a complex sheet comprising a layer of drylaid glass fibers and a layer of organic fibers, comprising:
  mechanical needling or fluid entanglement, e.g. hydroentanglement, of a nonwoven fabric of continuous organic fibers and of a veil of non-preconsolidated continuous glass fibers, the said nonwoven fabric of organic fibers and the said veil of glass fibers being juxtaposed and the said needles respectively the fluid, water jets being sent from the same side as the nonwoven fabric of organic fibers, in order to make a sheet; and then
  application of a binder to the bilayer.

The so obtained complex fibrous structure shows a low tendency to delaminate and can be impregnated with asphalt or bitumen, and used in the field of roofing, sealing covering or membranes.

14 Claims, No Drawings

COMPLEX COMPRISING A DRYLAID VEIL OF GLASS FIBRES, AND A NONWOVEN FABRIC OF ORGANIC FIBRES

CROSS REFERENCE

This application is a division of and is based upon and claims the benefit of priority under 35 U.S.C. §120 for U.S. Ser. No. 10/544,710, filed Jul. 25, 2006, now U.S. Pat. No. 7,412,756, which is a National Stage of PCT/EP04/01109, filed Feb. 6, 2004, and claims the benefit of priority under 35 U.S.C. §119 from European Patent Application No. 03290332.0, filed Feb. 11, 2003.

The invention relates to a complex fibrous structure comprising a veil of glass fibres and a nonwoven fabric of organic fibres, used in the field of roofing or sealing membranes.

Roofing or sealing coverings or membranes for the building sector may be produced by impregnating fibrous structures, such as glass-fibre or polyester-fibre veils, with an asphalt or bitumen. The glass fibres provide a high tensile strength, a high modulus at low elongation, but have a low tear strength and a low puncture resistance. Moreover, glass-fibre veils give the impregnated structure great dimensional stability during processing and over time, and a great fire retardancy.

Glass veils can be obtained by any technique known per se, in particular the so-called dry technique. This technique consists in drawing molten glass out of bushings, attenuating it into filaments by means of high pressure steam or air, depositing glass fibres onto a conveyor, applying a bonding composition to the veil, drying the veil in an oven, and then packaging the veil in the desired manner.

The final product is in the form of a fairly thin sheet with a thickness of around 0.2 to 0.8 mm, generally packaged as rolls. The binder often comes from an aqueous composition based on a urea-formaldehyde or melamine-formaldehyde resin. These resins having a satisfactory temperature withstand capability at the subsequent processing temperatures for bitumen impregnation.

However, glass veils have the drawback of a relatively low tear strength and puncture resistance. This is prejudicial to the ease of use and, in particular, requires the user to take precautions during handling to form the membrane or when laying it, for example on a roof.

To remedy this drawback, there are complex substrates that combine a veil based on organic fibres, exhibiting good tear strength, with a glass mesh that gives the assembly dimensional stability.

To improve the tear strength and the puncture resistance of glass-fibre veils, it has already been sought to combine them with organic fibres, especially made of polyester such as PET (polyethylene terephthalate).

EP 0 763 505 discloses a wetlaid glass-fibre mat, for the manufacture of bituminous roofing shingles, the strength of which is improved by means of a urea-formaldehyde binder modified by a self-crosslinkable vinyl additive. In this mat, it is possible for a minor proportion of fibres not to consist of glass fibres but to be chosen, especially, from organic fibres such as nylon, polyester, polyethylene or polypropylene fibres.

FR 2 804 677 teaches a fibre-based veil that can be used for making bituminous membranes, which comprises glass staple fibres and organic, especially PET, fibres bonded together by a binder, the fibres having a shrinkage at 130° C. of less than or equal to 5%. However, there are endeavours to further improve the tear strength properties of such veils by combining glass and PET fibres within the same layer.

Patents WO 01/09 428 and WO 01/09 420 have proposed structures that combine a glass veil with a polyester veil by needle bonding. According to this teaching, the glass veil is systematically bonded together by a binder before it is combined with the polyester veil.

WO 01/09 421 has proposed a similar structure, but the glass veil and the polyester veil are bonded together by hydrodynamical needling.

However, there is a certain tendency of these structures to delaminate.

U.S. Pat. No. 4,522,876 (Lydall) describes a textile composite fabric of non-woven, needled textile fibres which comprises at least one organic textile fibre layer of laid and needled textile organic fibres, at least one glass fibre layer of laid and needled glass staple fibres having a length of 1 to 10 mm, and a plurality of needled stitches composed essentially of the organic fibres from the organic fibre layer needled in and disposed substantially through the glass fibre layer. There are at least 700 stitches per square inch passing through the glass fibre layer during final needling. The fact that staple fibres are used renders necessary an intensive needling. Such a high density needling is necessary to bind together the staple fibres.

DE 7739489 U discloses a felt comprising a synthetic fibre web and a mineral fibre web. Needling is proposed only for the pre-consolidation of the organic web and not for binding both layers together. Both webs are then bonded only by a binder.

U.S. Pat. No. 5,616,395 (Freudenberg) discloses a process for the production of a two-layer textile reinforcement consisting, from a first layer based on nonwoven organic fibre cloth, in consolidating this nonwoven cloth by mechanical or hydraulic bonding and in thermostabilizing it. This first consolidated and thermostabilized layer is then assembled with a second mineral fibre layer, either by counter-gluing, or by needling, or by seam knitting, these two latter assembly methods being used only when the second mineral fibre layer is in the form of a grid or cloth of mineral filaments. The first assembly method by counter-gluing is itself used no matter what the structure is of the second mineral filament layer, whether it be in the form of a grid or a cloth of continuous or discontinuous mineral fibres or in the form of a scrim of mineral fibres. Thus, from this document, needling is not recommended when a scrim is used, and furthermore, if needling is applied, it is applied after a step of counter-gluing. This last process leads necessarily to a strong clogging of the needles of the needling machine.

The present invention relates to a fibrous structure combining, on the one hand, a layer of drylaid continuous glass fibres and, on the other hand, a layer of continuous organic fibres, the said structure being highly resistant to delamination.

According to the invention, the layer of organic fibres is juxtaposed with the glass fibres deposited as a veil, the said glass fibres being at this stage not bonded together, and then these two structures juxtaposed one on top of the other undergo a bonding step by mechanical needling or fluid entanglement, e.g. hydroentanglement, the needles respectively the fluid, water jets being applied to the layer of organic fibres. Then the bilayer thus obtained receives a chemical binder intended to further increase the cohesion of the assembly, not only within each of its individual layers but also to fasten the various layers together. The binder may comprise further additives, e.g. to improve fire retardancy, to increase adhesion to the bitumen, etc.

According to the invention, it has been found that the absence of pre-consolidation of the drylaid glass fibre web before fluid-jet or needle bonding makes the said fluid-jet or needle bonding more effective, which means that the interpenetration of fibres between the two different layers is greater. In addition, applying a binder to the entire structure comprising the two fibrous layers greatly contributes to improve the cohesion of the structure. Consequently, with a single binder-application step judiciously carried out after the two types of fibres have been juxtaposed, the final structure has a low tendency to delaminate. It was furthermore stated that the application of the binder after needling is more efficient because the needling steps creates channels through the structure facilitating the impregnation with the binder.

Mechanical needling is generally preferred to hydroentanglement, because it is more simple and cost-effective. However, hydroentanglement could be a way of approaching a more flattened product, because of the high quantity of water and of the water pressure.

Note that the expression "chemical bonding" is used in order to distinguish it from mechanical bonding, such as needle bonding or stitch bonding. A chemical binder is simply a product intended to intimately coat some of the fibres in order to form bridges between them, as a molten polymer would be able to do.

The nonwoven fabrics of organic fibres used within the context of the present invention generally have a mass per unit area ranging from 40 to 500 $g/m^2$ and more particularly from 80 to 300 $g/m^2$, for example about 150 $g/m^2$. In particular, it can be a "veil". The term "veil" is understood to mean a thin sheet of nonwoven.

The invention relates to a process for preparing a complex comprising a layer of drylaid glass fibres and a layer of organic fibres, comprising the following steps:
mechanical needling or fluid entanglement, e.g. hydroentanglement, bonding of a nonwoven fabric of continuous organic fibres and of a veil of non-preconsolidated continuous glass fibres, the said nonwoven fabric of organic fibres and the said veil of glass fibres being juxtaposed and the said needles respectively the fluid, water jets being sent from the same side as the veil of organic fibres, in order to make a bilayer; and then
application of a binder to the bilayer.

The manufacture of the glass-fibre veil is itself conventional in the field of manufacturing glass-fibre veils by the dry technique. It comprises a step of fiberizing glass and a step of forming a veil on a conveyor. At this stage, the glass-fibre veil is not bonded together. This means that, at this stage, no bridges are formed between the various glass fibres. At this stage, the glass-fibre veil has a mass per unit area of 20 to 150 $g/m^2$.

Next, a nonwoven fabric of organic fibres is combined with the glass-fibre veil by depositing one of these two elements on the other. The nonwoven fabric of organic fibres may be deposited on the glass-fibre veil or vice versa.

The nonwoven fabric of organic fibres may have been produced simultaneously with production of the glass-fibre veil.

However, the nonwoven fabric of organic fibres may also have been manufactured beforehand and stored in roll form. It is then used at a later stage when it is combined with the glass-fibre veil by unreeling rolls of organic fibres.

The two juxtaposed structures moving at the same speed then pass through a mechanical needling or fluid entanglement bonding device. Preferably, the needles respectively the fluid, water jets strike the two juxtaposed structures on the same side as the nonwoven fabric of organic fibres, since this nonwoven fabric is better able to withstand this treatment. Such mechanical needling or fluid entanglement bonding causes some of the organic fibres to penetrate the glass-fibre veil structure, which penetration is the origin of the better cohesion between the two types of fibres within the final complex. The hydroentanglement bonding for example may be carried out with a water pressure ranging from 50 to 600 bar and more particularly from 100 to 250 bar, for example about 180 bar.

Mechanical needling can be used. Surprisingly, a relatively light needling is sufficient and in fact preferred because the fibres (particularly the glass fibres) are less damaged. In general the number of penetrations per $cm^2$ will be in the range of between 15 to 150 stitches/$cm^2$, and can even be less than 75 stitches/$cm^2$, and even less than 50 stitches/$cm^2$. Preferably the amount of stitches is in the range between 30 to 75 stitches/$cm^2$, which is a considerably lower range than disclosed in the prior art, e.g. U.S. Pat. No. 4,522,876.

Needling is preferably carried out with barbed needles crossing the superimposed layers, wherein said needles are moving in the machine direction of the structure during the time that they are in the said structure. To carry out such a mechanical needling, one can for example use needling machines such as machine types PA169 or PA1500 or PA2000 marketed by Asselin (group NSC). In these types of machine, the needles describe an elliptic movement with a horizontal component making it possible for the needles in the structure to follow the structure in its displacement.

Such a particular needling allows high production rates up to 150 m/min and reduces undesired stretching of the structure.

Next, a binder is applied to the structure comprising both layers. This step is generally carried out by applying a binder precursor followed by a heat treatment, which converts the binder precursor into a binder. In this case, the bilayer passes through a unit for applying a binder precursor that may be applied by a cascade, which means that the binder precursor is poured in the liquid state (in which it is generally in the form of a solution or an emulsion or a dispersion), or in the foam state on top of the bilayer in order to impregnate it. In this unit, the bilayer may also be immersed in a liquid or foam bath containing the binder precursor and then dried. The presence of the binder in the final structure serves to give a better dimensional stability in the final application i.e. impregnation with hot bitumen or asphalt (for example: near 190° C.) and contributes also to increase the resistance to delamination. The binder is stable at the temperature of impregnation with bitumen or asphalt.

The binder may be of the type of those normally used for glass-fibre veils or polyester veils. In particular, it may be a plasticised polyvinyl acetate (PVAc) of medium high molecular weight like Mowilith D50 of Clariant, Vinnapas Z54 of Wacker, or a self-crosslinkable acrylic such as Resin HF 05 A of Rohm and Haas or Acrodur 950L of BASF, or acrylics like Acronal S888S or Primal HA 12 or 16 of Rohm and Haas or styrene-butadiene Lutofan DS 2380 of BASF, or urea-formaldehyde such as Urecoll 150, or melamine formaldehyde like Saduren 163 of BASF. About the melamine formaldehyde, EP 379100 describes the use of a melamine formaldehyde precondensate having a molar ratio of melamine to formaldehyde from 1:1 to 1:3,5. We have found that using such a precondensate in a molar ratio of melamine to formaldehyde of 1:4 to 1:6 we obtain maximal delamination strength between the two layers. Thanks to the effect of the needling plus the use of a binder it is impossible to delaminate the obtained product following the delamination measurement method DIN 54310. The binder may also be a mixture of two or more of these components, in particular a mixture of urea formaldehyde or melamine formaldehyde with acrylic and/or polyvinylacetate may be used. The excess binder precursor may be removed by suction through the conveyor belt.

The purpose of the heat treatment step is to evaporate the water and effect the possible chemical reactions between the various constituents and/or to convert the binder precursor into a binder and/or to give the binder its final structure.

The heat treatment may be carried out by heating between 140 and 250° C., more generally between 180 and 230° C. The heat treatment time is generally from 2 seconds to 3 minutes and more generally from 1 to 2 minutes, for example 90 seconds at 200° C. The structure may be heat-treated in a hot-air oven, the air circulating through the conveyor belt. The heat treatment may also be carried out by contact with heated rolls. The latter solution is preferred since it allows the dimensions of the structure to be better preserved during the heat treatment.

In addition to the two layers (nonwoven fabric of organic fibres and veil of glass fibres), the structure can include an intermediate layer, placed between both layers, made up of yarns or a grid to increase the mechanical resistance of the structure. In case of yarns, these yarns of reinforcement generally have the same direction as that of manufacture (longitudinal yarns). These yarns or grid of reinforcement can also be included in one or both principal layers. The distance between two neighbouring yarns can range from 3 to 50 mm. In the case of a grid, the distance between yarns constituting it can range from 3 to 50 mm. These yarns or this grid can be made of polyester or glass or another high-modulus material. These yarns or this grid can be applied during the assembly of the two other layers, and are to be placed between said two layers or within one or both principal layers. These yarns or grid of reinforcement thus undergo the same treatments of needling and of application of the binder as the two principal layers. It was observed that the needling according to the invention did not damage the grid or yarn of reinforcement.

In general, the final complex has a mass per unit area ranging from 63 to 840 g/m$^2$ and more generally from 115 to 550 g/m$^2$. This complex generally contains:
  from 20 to 150 g/m$^2$, and more generally from 30 to 100 g/m$^2$, of glass fibres, including their possible sizing;
  from 40 to 500 g/m$^2$, and more generally from 80 to 300 g/m$^2$, of organic fibres; and
  from 3 to 190 g/m$^2$, and more generally from 5 to 150 g/m$^2$, of binder, which includes any binder contained in the nonwoven fabric of organic fibres before it is assembled with the veil of glass fibres.

The complex thus obtained has:
a high tear strength;
a high tensile strength and elongation;
a good fire retardancy;
a high puncture resistance;
a high resistance to delamination;
a suitable air permeability; and
an excellent dimensional stability during impregnation with bitumen or asphalt and over time.

The glass fibres may have a diameter ranging from 8 to 20 μm and more particularly ranging from 10 to 16 μm. They are theoretically continuous. Their actual length is generally between 10 cm and 1 m. For the ordinary skilled man, such lengths correspond to "continuous" fibres (contrary to staple fibres having a length for example shorter than 10 mm which are designated as "short fibres"). The glass fibres may, for example, be E-glass or C-glass fibres.

The organic fibres may be made of a polyolefin, such as polyethylene or polypropylene, but are preferably made of polyester and more particularly of polyethylene terephthalate (PET). These fibres may have a linear density ranging from 2 to 30 dtex (1 dtex represents 1 dg fibre per kilometer) and more particularly ranging from 3 to 20 dtex. The fibres contained in the nonwoven fabric of organic fibres, and therefore also in the final complex, are continuous.

Before being combined with the glass-fibre veil, the nonwoven fabric of organic fibres may have been preconsolidated by well-known means such as needling, calendering, hydroentanglement or chemical bonding. A "chemical" binder could be present in an amount ranging from 3 to 25% by weight of the nonwoven fabric of organic fibres. However, preferably, the nonwoven fabric of organic fibres contains no chemical binder before being combined with the glass-fibre veil. This is because it is preferred for this nonwoven fabric of organic fibres to have been simply needled or hydroentangled beforehand. The absence of binder from the nonwoven fabric of organic fibres makes the needled or fluid entangled bonding carried out on the bilayer more effective. In addition, the entire operation to produce the complex according to the invention then requires only a single binder application step, which is carried out on the needled- or fluid entangled bonded bilayer. In this case, the final complex sheet obtained is such that the binder is distributed approximately uniformly through the thickness.

In all cases, before being combined with the glass-fibre veil, the nonwoven fabric of organic fibres is dimensionally stabilized by a heat pre-treatment, generally between 70 and 240° C. in the case of polyester, so that its dimensions do not vary greatly during the process of manufacturing the complex according to the present invention, which may also involve a heat treatment. Such a heat pre-treatment on the nonwoven fabric of organic fibres alone is for example carried out by passing the said nonwoven fabric of organic fibres between heated cylindrical rolls or under infrared panels or by similar means.

EXAMPLE 1

A glass veil was prepared by a dry technique.

This glass veil had a surface density of about 50 g/m$^2$. It contained no binder. This veil was combined in this state with a nonwoven fabric of polyester of the PET type processed earlier, that is to say it was manufactured and stored beforehand as a reel that was unwound in order to combine it with the glass veil. This polyester nonwoven fabric had a mass per unit area of 150 g/m$^2$. To manufacture it, it was pre-needle-bonded and then stabilized by a heat-treatment at 180° C.

The PET nonwoven fabric was continuously unwound on top of the glass web. Then the two juxtaposed fabrics underwent a water-jet bonding operation at a water pressure of 180 bar, via the top side, that is to say the PET side, and then the assembly passed through a binder bath containing water and 20% by weight of binder. This binder comprised, by weight, 80% urea-formaldehyde (Sadecol L 5271 of Sadepan), 10% acrylic (Acronal 280 KD of BASF) and 10% polyvinyl acetate (Vinavil KAR of Vinavil). After draining off the excess binder, the assembly was dried between a series of heated rolls.

The final bilayer comprised about 16% by weight of binder and had a mass per unit area of 240 g/m$^2$. It comprised about 50 g/m$^2$ of glass fibres, about 150 g/m$^2$ of PET fibres and about 40 g/m$^2$ of binder. This bilayer had the following properties:
  delamination resistance: greater than 20 N/5 cm-tensile strength at 20° C. in Machine Direction: 600 N/5 cm;
  tensile strength at 180° C. in Machine Direction: 160 N/5 cm;
  air permeability: greater than 1700 litres/s·m$^2$.

It also exhibited good dimensional stability and showed no wrinkles when tested in oven at 180° C. for 5 min, which indicates a good dimensional stability when impregnated with hot asphalt.

EXAMPLE 2

The product was manufactured in two steps. The first step consisted of fiberizing continuous polyester (PET) fibres on a conveyor belt in such way that they formed a regular mat I. The weight of this mat was 160 g/m$^2$. This mat was then preneedled using about 15 stitches/cm$^2$. After that the mat was thermally treated on a hot roll system in order to be stabilized. The second step was to form on this mat a second mat of continuous glass fibre which weight was 50 g/m$^2$. The polyester mat passed on the belt in the plenum chamber in which the glass was attenuated and deposited.

The bilayer was then needled from the bottom side in order to make the polyester fibres enter into the glass mat without disturbing it. The needling density was 42 stitches/cm$^2$ and the penetration depth was 9 mm. To avoid orientation in the product a Dilo needling machine equipped with the hyperpunch system was used.

Next step was the binder application. The binder was an aqueous dispersion of a mix of melamine formaldehyde Saduren 163 and styrene butadiene Lutofan DS 2380 in the proportion of 10/90 on dry weight.

The binder was applied through a cascade and the excess was removed with a suction device. The solid content of binder deposited was 10% in weight. Then the product was dried and the binder cured in a hot air through dryer. Temperature was about 220° C. and residence time 2 minutes. Then the product was wound.

The following characteristics were measured on the final complex sheet:
 delamination resistance: impossible to delaminate;
 tensile strength at 20° C. in Machine Direction: 484 N/5 cm (308 in Cross Machine Direction);
 tensile strength at 180° C. in Machine Direction: 174 N/5 cm.

It also exhibited good dimensional stability and showed no wrinkles when tested in oven at 180° C. for 5 min, which indicates a good dimensional stability when impregnated with hot asphalt.

EXAMPLE 3

Same as example 2 but during the step of glass mat formation longitudinal reinforcement threads were introduced in the middle of the thickness of the glass layer. This reinforcement was continuous glass yarn of 68 tex. The distance between the yarns was 16 mm. The depth of penetration of the needles was 12 mm.

The following characteristics are measured
 delamination resistance: impossible to delaminate;
 tensile strength at 20° C. in Machine Direction: 448 N/5 cm; (414 in Cross Machine Direction);
 tensile strength at 180° C. in Machine Direction: 181 N/5 cm.

It also exhibited good dimensional stability and showed no wrinkles when tested in oven at 180° C. for 5 min, which indicates a good dimensional stability when impregnated with hot asphalt.

The invention claimed is:

1. A process for preparing a complex sheet consisting of a principal layer of drylaid glass fibers, a principal layer of organic fibers, and optionally an intermediate layer of yarns or a grid placed between two principal layers or within one or both principal layers, the process comprising:
 fluid entanglement with a water pressure ranging from 50 to 600 bar, of a nonwoven fabric of continuous organic fibers and of a veil of non-preconsolidated continuous glass fibers 10 cm to 1 m in length, the nonwoven fabric of organic fibers and the veil of glass fibers being juxtaposed and the fluid water jets being sent from the same side as the nonwoven fabric of organic fibers, to make a sheet; and then
 application of a binder to the sheet.

2. A process according to claim 1, wherein the water pressure ranges from 100 to 250 bar.

3. A process according to claim 1, further comprising a heat treatment after application of the binder.

4. A processing according to claim 1, wherein the binder is one of plasticised polyvinyl acetate and self-crosslinkable acrylic.

5. A processing according to claim 1, wherein the principal layer of organic fibers is a veil.

6. A processing according to claim 1, wherein a thickness of the non-preconsolidated continuous glass fibers is 0.2 to 0.8 mm.

7. A processing according to claim 1, wherein the intermediate layer is made of polyester or glass fibers.

8. A processing according to claim 1, wherein a binder is applied by the application of a binder precursor followed by a heat treatment.

9. A processing according to claim 1, wherein the nonwoven fabric of organic fibers is not preconsolidated before juxtaposition with the glass-fiber veil.

10. A processing according to claim 1, wherein the complex sheet has a mass per unit area ranging from 63 to 840 g/m$^2$.

11. A processing according to preceding claim 1, wherein the complex sheet has a mass per unit area ranging from 115 to 550 g/m$^2$.

12. A processing according to claim 1, wherein the complex sheet contains:
 from 20 to 150 g/m$^2$ of glass fibers;
 from 40 to 500 g/m$^2$ of organic fibers;
 and from 3 to 190 g/m$^2$ of binder.

13. A processing according to claim 1, wherein a production rate is at least 10 m/min.

14. A process for preparing a complex sheet consisting of a principal layer of drylaid glass fibers, a principal layer of organic fibers, and optionally an intermediate layer of yarns or a grid, the process comprising forming a structure by:
 forming a veil of non-preconsolidated continuous glass fibers 10 cm to 1 m in length on a conveyor followed by depositing a veil of a nonwoven fabric of continuous organic fibers on said veil of non-preconsolidated continuous glass fibers or
 forming a veil of non-preconsolidated continuous glass fibers on a veil of a nonwoven fabric of continuous organic fibers,
 an intermediate layer of yarns or a grid being applied during the assembly of the two principal layers, and placed between said two layers or within one or both principal layers;
 wherein fluid entanglement with a water pressure ranging from 50 to 600 bar is applied on the structure, the fluid water jets being sent from the same side as the veil of organic fibers, to make a sheet; and then application of a binder to the sheet.

* * * * *